(12) United States Patent
Cheng et al.

(10) Patent No.: US 10,126,810 B2
(45) Date of Patent: Nov. 13, 2018

(54) METHOD FOR CONTROLLING POWER GENERATION UNIT TO DESIRED OUTPUT AS SPECIFIED BY LOAD DEMAND SIGNAL BY USING MODIFIED CONTROL SIGNAL

(71) Applicant: EMERSON PROCESS MANAGEMENT POWER & WATER SOLUTIONS, INC., Pittsburgh, PA (US)

(72) Inventors: Xu Cheng, Pittsburgh, PA (US); Richard W. Kephart, Kittanning, PA (US); Steven J. Schilling, Pittsburgh, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 510 days.

(21) Appl. No.: 14/868,650

(22) Filed: Sep. 29, 2015

(65) Prior Publication Data

US 2017/0090548 A1 Mar. 30, 2017

(51) Int. Cl.
*G06F 1/32* (2006.01)
*F01K 13/02* (2006.01)

(52) U.S. Cl.
CPC ............ *G06F 1/3287* (2013.01); *F01K 13/02* (2013.01); *G06F 1/3206* (2013.01); *G06F 1/3296* (2013.01); *Y02P 90/02* (2015.11)

(58) Field of Classification Search
CPC ...... F01K 13/02; G06F 1/3206; G06F 1/3287; G06F 1/3296; Y02P 90/02

USPC .................................................. 700/286, 295
See application file for complete search history.

(56) References Cited

U.S. PATENT DOCUMENTS

| 4,333,310 | A  | * | 6/1982  | Uram ................... F01K 23/105 60/39.182 |
| 5,517,424 | A  | * | 5/1996  | Marcelle .................. H02J 3/00 290/52 |
| 7,451,004 | B2 | * | 11/2008 | Thiele ................. G05B 13/048 700/28 |
| 7,826,908 | B2 | * | 11/2010 | Cheng ................. G05B 13/021 60/665 |
| 8,527,252 | B2 |   | 9/2013  | Kephart et al. |

(Continued)

FOREIGN PATENT DOCUMENTS

| EP | 2 876 267 A1 | 5/2015 |
| EP | 3 118 426 A1 | 1/2017 |

OTHER PUBLICATIONS

F. Fang, W. Tan, and J.Z. Liu, Tuning of Coordinated Controllers for Boiler-turbine Units, *Acta Automatica Sinica*, vol. 31, No. 2, 2005, pp. 291-296.

(Continued)

*Primary Examiner* — Chun Cao
(74) *Attorney, Agent, or Firm* — Marshall, Gerstein & Borun LLP

(57) ABSTRACT

An optimal feedforward control design for controlling equipment performs intermittent re-initialization based on estimated state information. A model-based constrained optimization is explicitly performed during the feedforward calculation. During the course of operation of the equipment, state estimation is continuously performed. When a load target change is detected, the estimated state may serve as the new signal baseline.

24 Claims, 6 Drawing Sheets

(56) References Cited

U.S. PATENT DOCUMENTS

| | | | |
|---|---|---|---|
| 8,560,283 B2 | 10/2013 | Cheng et al. | |
| 9,404,426 B2* | 8/2016 | Wichmann | F02C 9/50 |
| 2013/0110298 A1* | 5/2013 | Beveridge | F01K 13/02 |
| | | | 700/287 |
| 2016/0248263 A1* | 8/2016 | Hunt | H02J 7/022 |

OTHER PUBLICATIONS

W. Tan, H.J. Marquez, T.W. Chen, and J.Z. Liu, Analysis and control of a nonlinear boiler-turbine unit, *Journal of Process Control*, vol. 15, No. 8, 2005, pp. 883-891.

P.C. Chen, and J.S. Shamma, Gain-scheduled l1-optimal control for boiler-turbine dynamics with actuator saturation, *Journal of Process Control*, vol. 14, No. 3, 2004, pp. 263-277.

Z.Y. Huang, D.H. Li, X.Z. Jiang, and L.M. Sun, Gain scheduled servo system for boiler-turbine unit, *Proceedings of CSEE*, vol. 23, No. 10, 2003, pp. 191-198.

W.G. Kim, U.C. Moon, S.C. Lee, and K.Y. Lee, Application of dynamic matrix control to a boiler-turbine system, *IEEE Power Engineering Society General Meeting*, vol. 2, San Francisco, CA, 2005, pp. 1595-1600.

Z.J. Li, Z.X. Li, W. Tan, and J.Z. Liu, "Constrained dynamic matrix control for a boiler-turbine unit", *in the Proceedings of the Fifth International Conference on Machine Learning and Cybernetics*, Dalian, China, 2006, pp. 665-670.

W. Tan, Y.G. Niu, and J.Z. Liu, Robust control for nonlinear boilerturbine system, *Control Theory and Application*, vol. 16, No. 2, 1999, pp. 863-867.

H. Zhao, W. Li, C. Taft, and J. Benstman, Robust controller design for simultaneous control of throttle pressure and magawatt output in a power plant unit, *International Journal of Robust and Nonlinear Control*, vol. 9, No. 7, 1999, pp. 425-446.

Rossiter, J.A., Kouvaritakis, B., & Dunnett, R. M., Application of Generalized Predictive Control to a Boiler-Turbine Unit for Electricity Generation. *IEE Proceedings D*, 138(1), Jan. 1991.

Xu Cheng, Richard Kephart, and Charlie Menten, "Model-based once-through boiler start-up water wall steam temperature control" *IEEE Conference on Control Applications*, Anchorage. Sep. 2000. pp. 778-783.

Kwong Ho Chan, Erik Ydstie, and Xu Cheng, "Advanced Control Design for Boiler-Turbine Unit" *IEEE Conference on Control Applications*, Denver. Sep. 2011.

Search Report for Application No. GB1616024.4, dated Feb. 7, 2017.

* cited by examiner

METHOD FOR CONTROLLING POWER GENERATION UNIT TO DESIRED OUTPUT AS SPECIFIED BY LOAD DEMAND SIGNAL BY USING MODIFIED CONTROL SIGNAL

TECHNICAL FIELD

The present disclosure generally relates to the control of process plants and power generating equipment and, more particularly, to the implementation of variable rate feedforward control circuitry to be used with varying load demand set point signals.

BACKGROUND

A number of industrial and non-industrial applications use multi-component power generating devices. Industrial sites such as power plants may include a boiler-turbine unit in which a fuel-burning boiler generates thermal energy such as steam to operate one or more steam turbines, which in turns generates electricity. In these systems, one control objective is to adjust the power output to meet demands while maintaining stream pressure and temperature within desired ranges.

A typical steam generating system used in a power plant includes a boiler having a superheater section (having one or more sub-sections) in which steam is produced and is then provided to and used within a first, typically high pressure, steam turbine. To increase the efficiency of the system, the steam exiting this first steam turbine may then be reheated in a reheater section of the boiler, which may include one or more subsections, and the reheated steam is then provided to a second, typically lower pressure steam turbine. Both the furnace/boiler section of the power system as well as the turbine section of the power system must be controlled in a coordinated manner to produce a desired amount of power.

Moreover, the steam turbines of a power plant are typically run at different operating levels at different times to produce different amounts of electricity or power based on variable energy or load demands provided to the power plant. For example, in many cases, a power plant is tied into an electrical power transmission and distribution network, oftentimes referred to as a power grid, and the power plant provides a designated amount of power to the power grid. In this case, a power grid manager or control authority typically manages the power grid to keep the voltage levels on the power grid at constant or near-constant levels (that is, within rated levels) and to provide a consistent supply of power based on the current demand for electricity (power) placed on the power grid by power consumers. The grid manager may typically plan for heavier use and thus greater power requirements during certain times of the days than others, and during certain days of the week and year than others, and may run one or more optimization routines to determine the optimal amount and type of power that needs to be generated at any particular time by the various power plants connected to the grid to meet the current or expected overall power demands on the power grid.

As part of this process, the grid manager typically sends power demand requirements (also called load demand set points) to each of the power plants supplying power to the power grid, wherein the power demand requirements or load demand set points specify the amount of power that each particular power plant is to provide onto the power grid at any particular time. To effect proper control of the power grid, the grid manager may send new load demand set points for the different power plants connected to the power grid at any time, to account for expected and/or unexpected changes in power being supplied to or consumed from the power grid. For example, the grid manager may modify the load demand set point for a particular power plant in response to expected or unexpected changes in the demand (which is typically higher during normal business hours and on weekdays, than at night and on weekends) Likewise, the grid manager may change the load demand set point for a particular power plant in response to an unexpected or expected reduction in the supply of power on the grid, such as that caused by one or more power units at a particular power plant failing unexpectedly or being brought off-line for normal or scheduled maintenance.

In any event, while the grid manager may provide or change the load demand set points for particular power plants at any time, the power plants themselves cannot generally increase or decrease the amount of power being supplied to the power grid instantaneously, because power generation equipment typically exhibits a significant lag in response time due to the physical characteristics of these systems. For example, to increase the power output of a steam turbine based power generation system, it is necessary to change the amount of fuel being spent within the system, to thereby increase the steam pressure or temperature of the water within the boiler of the system, all of which takes a finite and non-trivial amount of time. Thus, generally speaking, power plants can only ramp up or ramp down the amount of power being supplied to the grid at a particular rate, which is based on the specifics of the power generating equipment within the plant.

In turbine based power plant control systems needing multiple control loops, standard multi-loop, single-input-single-output (SISO) strategies include turbine-following and boiler-following configurations. In turbine-following approaches, a power output is controlled by the boiler fuel input, and conversely, in boiler-following approaches, the power output is controlled by a steam throttle valve position, as the power output is directly proportional to the amount of steam supplied to the turbine. Generally, the turbine-following approach provides good control in the form of minimal variations of steam temperature and pressure, but the turbine-following approach cannot track the load demand quickly due to the slow steam generation process implemented in conventional power plants. In contrast, by controlling the throttle valve in the boiler-following approach, different amounts of steam may be immediately supplied to the turbine, but control is provided at the expense of depleting stored energy in the boiler, leading to main-steam pressure variations. Accordingly, for conventional plants operating at base-load, turbine-following approaches are preferred, while for conventional plants operating in ramp-load modes, the boiler-following approach is preferred.

Moreover, in power plants that use a boiler to generate power, a power plant controller typically uses a feedback controller to change a variable (commonly referred to as "trimming action") to achieve a desired result based on information from system measurements to account for unknown system disturbances and process uncertainties. The power plant controller may also incorporate a feedforward (or anticipative) controller which foresees (predicts) future changes and provides quick action to increase or decrease the output power in response to an expected change in a load demand profile, which may be made either locally or by a remote dispatch (e.g., by the grid manager).

In current approaches, feedforward design is based on load demand profiles and is sometimes coupled with a dynamic "kicking" action which increases the response rate of the boiler as compared to a linear function of the load demand index. Feedback control often uses proportional-integral-derivative (PID) controllers.

An immediate drawback of using current feedforward approaches occurs due to the use of a steady-state load demand curve that does not provide guaranteed dynamic accuracy. Further, when the load target changes in the middle of a load ramping process, the current state is not taken into account in subsequent calculations. In other words, the conventional feedforward calculation treats the new load ramping process as if it always starts from a steady-state condition, and does not account for the present operational state of the equipment, which may include a current variable as well as a rate of change in that variable.

SUMMARY

A feedforward control design is provided for use in a power plant control system, such as a steam turbine power plant control system, which performs intermittent re-initialization based on estimated state information. In this approach, a model-based constrained optimization is explicitly performed during the feedforward calculation to assist in obtaining more optimal performance. During the course of operation of the equipment, state estimation, which relates to present operational conditions, is continuously performed. When a load target change is detected during an ongoing load ramp process, the presently estimated state information is used in the calculation of an updated control signal to be sent to the control system. As such, the updated control signal is more accurate and may be used to properly adjust parameters affecting the performance and output of the power plant.

An approach for using a state estimation for calculating a modified load ramp control signal is provided and may include determining, using a computing device, an initial model for an initial load ramp process based on a first load demand set point signal which indicates a first desired output of the power generating unit. A state estimation is periodically performed on the initial load ramp process to obtain a current state estimation. Upon receiving a second load demand set point signal (which indicates a second desired output of the power generating unit), the current state estimation is used to calculate a modified control signal for the modified load ramp process. The modified control signal is then used to operate the power generating unit such that the unit reaches the second desired output specified by the second load demand set point signal. The state estimation may be one of a linear or a nonlinear calculation process.

In some examples, an error value may be computed as the difference between the target setpoint and an actual operational power output of the power generating unit, and may be used to create a new modified control signal that minimizes the error value such that a subsequently calculated error value is within an allowable threshold.

In other embodiments, a control system for controlling a power generating unit is provided and includes a state estimation unit, a calculation unit coupled to the state estimation unit, and a control signal generator. The calculation unit is adapted to receive at least a first load demand set point signal that specifies a first load demand set point. The state estimation unit may be adapted to measure at least one characteristic associated with a current operational state of the power generating unit and to generate a current state calculation based on at least one characteristic.

In some embodiments, the calculation unit is adapted to calculate a first set of operational parameters based on the first load demand set point and to calculate a second set of operational parameters based on the second load demand set point and current state calculation. In some approaches, the calculation unit only calculates the second set of operational parameters upon receiving a load demand set point signal. The control signal generator generates a control signal to control the power generating unit based on at least one of the first and/or the second set of operational parameters.

In some approaches, the characteristic includes at least one of an operational pressure and/or power generation of the power generating unit. Further, the calculation unit may be adapted to calculate an error value which represents a difference between actual operational parameters at a given time and the second set of operational parameters at a given time. Upon the difference exceeding a threshold value, the state estimation unit is adapted to measure at least one subsequent characteristic. The calculation unit is then adapted to calculate a subsequent set of operational parameters based on the at least one subsequent characteristic and the output is adapted to control the power generating unit based on the subsequent set of operational parameters.

In other forms, an approach for controlling equipment in a plant is provided and includes configuring an initial optimal operational model based on an initial load demand set point signal which represents an initial load demand set point, controlling the equipment in the plant using at least the initial optimal operational model, and periodically running a model-based state estimation on the equipment to obtain a current state estimation. The model-based state estimation may be based on a plurality of operational values of the equipment.

These approaches may further include determining whether a new load demand set point signal is received, the new load demand set point signal representing a new load demand set point. Upon receiving the new load demand set point signal, the approach may compute a new optimal operational feedforward control trajectory using the current state estimation. The equipment may then be controlled using the new optimal operational feedforward control trajectory.

In some embodiments, a feedback control calculation may be run in addition to the model-based state operation. This feedback control calculation may include any one of a proportional-integral-derivative controller, a lead-lag controller, a model predictive controller, and a linear-quadratic-Gaussian controller. Other examples are possible. The equipment may then be controlled using the feedback control calculation.

In other embodiments, the approach may determine whether the equipment has reached the new load demand set point. Upon determining the equipment has not reached the new load demand set point, a subsequent optimal operational feedforward and feedback control trajectory using a model-based state estimation representative of a current time may be computed.

In yet other examples, a boiler operated power plant includes a turbine, a boiler coupled to the turbine which operates to create steam to drive the turbine, a control unit communicatively connected to the boiler, and a control signal combiner. The control unit includes a feedback controller which produces a feedback control signal and a feedforward controller that produces a feedforward control signal. This feedforward controller includes a state estimation unit, a calculation unit, and a feedforward control signal generator. The state estimation unit measures at least one characteristic associated with a current operational state of the power generating unit and generates a current state calculation based on at least one characteristic. The calculation unit receives at least a first load demand set point signal that specifies a first load demand set point and a second load demand set point signal specifying a second load demand set point and calculates a first set of operational parameters based on the first load demand set point and further calculates a second set of operational parameters based on the second load demand set point and the current state calculation. The feedforward control signal generator produces the feedforward control signal which includes a first response characteristic after receiving the first demand set point signal, the first response characteristic based on the first set of operational parameters, and generates the feedforward control signal which includes a second, different response characteristic upon receiving the second demand set point signal. This second response characteristic is based on the second set of operational parameters. Finally, the control signal combines the feedforward control signal and the feedback control signal to create a master control signal for controlling the boiler.

The feedback controller may be one of a proportional-integral-derivative controller, a lead-lag controller, a model predictive controller, and a linear-quadratic-Gaussian controller. Other examples are possible. The feedforward controller may be adapted to produce a control signal only upon receiving a load demand set point signal. In some examples, when the state estimation unit is described by a nonlinear dynamic process, a nonlinear calculation unit is used. Conversely, when the state estimation unit is described by a linear dynamic process, a linear calculation unit is used.

So configured, the control system may accurately determine the current state of the equipment and generate a new control signal used to control the equipment to meet the modified load demand. By incorporating the optimal feedforward control design described herein, the major control signals (boiler master control and turbine master control) will directly position the megawatt (MW) output and steam pressure to their desired levels without requiring significant movement from the feedback control portion of the system, thus reducing potential process oscillations induced by poor feedback design and/or tuning.

BRIEF DESCRIPTION OF THE DRAWINGS

The above needs are at least partially met through provision of a feedforward control design described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less cluttered view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
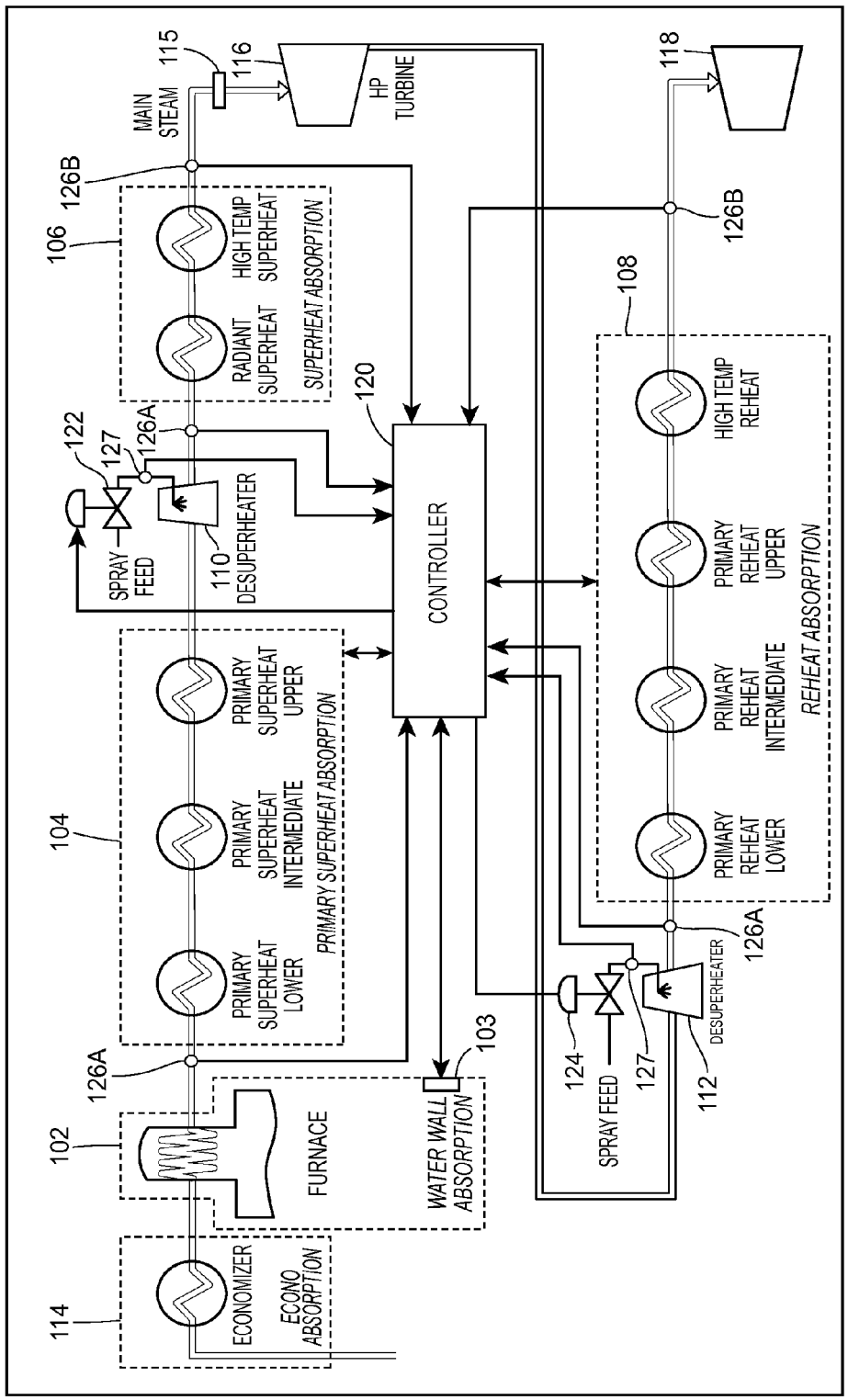
FIG. 1 illustrates a block diagram of a typical boiler steam cycle for a steam powered turbine system in accordance with various embodiments of the invention.

Referring now to the drawings, FIG. 1 illustrates a block diagram of a once-through boiler steam cycle for a typical boiler 100 that may be used, for example, in a thermal power plant. The boiler 100 may include various sections through which steam or water flows in various forms such as superheated steam, reheated steam, etc. The boiler 100 includes a master control 103 for regulating fuel input, a furnace and a primary water wall absorption section 102, a primary superheater absorption section 104, a superheater absorption section 106 and a reheater section 108. Additionally, the boiler 100 may include one or more desuperheaters or sprayer sections 110 and 112 and an economizer section 114. During operation, the main steam generated by the boiler 100 and output by the superheater section 106 is used to drive a high pressure (HP) turbine 116 and the hot reheated steam coming from the reheater section 108 is used to drive an intermediate pressure (IP) turbine 118. A turbine master valve 115 is responsible for adjusting the input to the turbine to regulate its power. Typically, the boiler 100 may also be used to drive a low pressure (LP) turbine, which is not shown.

The water wall absorption section 102, which is primarily responsible for generating steam, includes a number of pipes through which water or steam from the economizer section 114 is heated in the furnace. Of course, feedwater coming into the water wall absorption section 102 may be pumped through the economizer section 114 and this water absorbs a large amount of heat when in the water wall absorption section 102. The steam or water provided at the outlet of the water wall absorption section 102 is fed to the primary superheater absorption section 104, and then to the superheater absorption section 106, which together raise the steam temperature to very high levels. The main steam output from the superheater absorption section 106 drives the high pressure turbine 116 to generate electricity.

Once the main steam drives the high pressure turbine 116, the steam is routed to the reheater absorption section 108, and the hot reheated steam output from the reheater absorption section 108 is used to drive the intermediate pressure turbine 118. The spray sections 110 and 112 may be used to control the final steam temperature at the inputs of the turbines 116 and 118 to be at desired setpoints. Finally, the steam from the intermediate pressure turbine 118 may be fed through a low pressure turbine system (not shown here), to a steam condenser (not shown here), where the steam is condensed to a liquid form, and the cycle begins again with various boiler feed pumps pumping the feedwater through a cascade of feedwater heater trains and then an economizer for the next cycle. The economizer section 114 is located in the flow of hot exhaust gases exiting from the boiler and uses the hot gases to transfer additional heat to the feedwater before the feedwater enters the water wall absorption section 102.

A controller 120 is communicatively coupled to the furnace within the water wall adsorption section 102 and to valves 122 and 124 which control the amount of water provided to sprayers in the spray sections 110 and 112. The controller 120 is also coupled to various sensors, including temperature sensors 126 located at the outputs of the water wall adsorption section 102, the desuperheater section 110, the second superheater section 106, the desuperheater section 112 and the reheater section 108 as well as flow sensors 127 at the outputs of the valves 122 and 124. The controller 120 also receives other inputs including the firing rate, a signal (typically referred to as a feedforward signal) which is indicative of and a derivative of the load, as well as signals indicative of settings or features of the boiler including, for example, damper settings, burner tilt positions, etc.

The controller 120 may generate and send other control signals to the various boiler and furnace sections of the system and may receive other measurements, such as valve positions, measured spray flows, other temperature measurements, etc. While not specifically illustrated as, the controller 120 may include separate sections, routines and/or control devices for controlling the superheater and the reheater sections of the boiler system.

Figure 2:
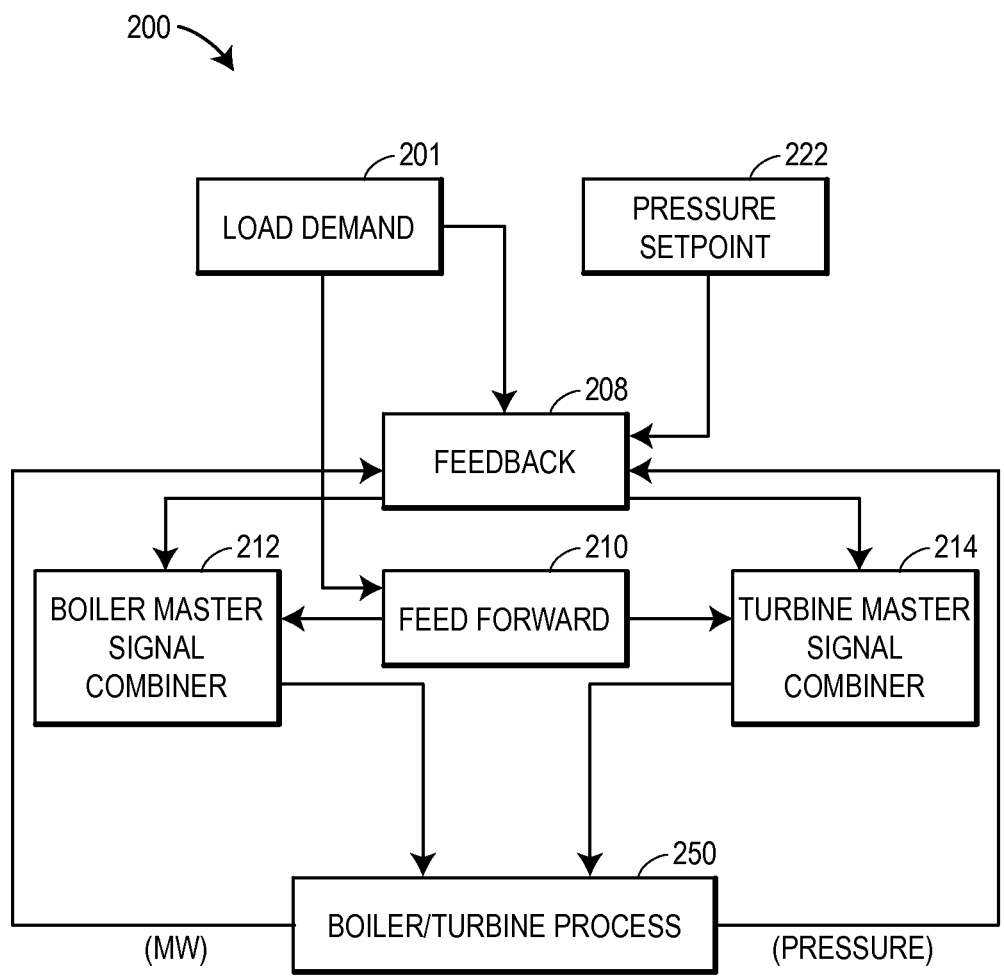
FIG. 2 illustrates a schematic block diagram of a control circuit used to provide both feedforward and feedback control in a power plant having a boiler and a turbine and being configured in a turbine-follow mode in accordance with various embodiments of the invention.

FIG. 2 illustrates a detailed flow diagram of a control system 200 that may be used in power plant 100 of FIG. 1 as part of the controller 120 to control a boiler/turbine process 250. The control system 200 includes a load demand signal 201, a feedback controller 208, a feedforward controller 210, a boiler master signal combiner 212, a turbine master signal combiner 214, a pressure set-point 222, and a boiler/turbine process signal 250. It is understood that the control system 200 may include additional components and/or generate additional control signals, but for the sake of clarity, they are not illustrated in FIG. 2. Further, while a single feedback controller 208 and feedforward controller 210 are provided for producing both a boiler master control signal and a turbine master control signal, it will be understood that separate feedback controllers 208 and/or feedforward controllers 210 may be used for the generation of each of the boiler and turbine master signals if desired.

The load demand 201 represents set point signals which include load demand set points. The load demand 201 is used as the primary control signal to control the power plant 100. A load demand index is produced using the load demand via any combination of computational devices. This load demand index is then used to control operation of the turbine 102 and the boiler 106, which may include any number of valves, pumps, and other equipment to generate power. Similarly, the pressure set-point 222 includes information and/or any number of signals relating to the amount of steam pressure to be generated by the boiler to power the turbines to meet the desired load set-point.

As illustrated in FIG. 2, the load demand 201 and the pressure set point 222 are connected in a turbine-follow mode. In other words, the power output (typically presented in Megawatts or MW) is controlled by the boiler fuel input. It is understood that a boiler-follow mode may be utilized in some approaches, whereby the power output is controlled by the throttle valve position as the power output is directly proportional to the amount of steam supplied to the turbine. In other case, the turbine-follow mode may be used because this mode provides minimal variations to steam temperature and pressure. However, the turbine-follow mode cannot quickly track the load demand due to the slow steam generation in conventional coal-fired power plants. Instead, by opening and/or adjusting the throttle valve, different quantities of steam may be immediately supplied, but this is at the expense of depleting energy stored in the boiler, which may in turn lead to main-steam pressure variations. Accordingly, for conventional coal-fired plants operating at baseload, the turbine-follow mode may be preferred, whereas power plants which are operating in a ramp-mode (e.g., AGC mode), the boiler-follow mode may be preferred.

The feedback controller 208 may be any type of controller such as, for example, a proportional-integral-derivative (PID) controller or any variant thereof, although other types of controllers may be used. Generally speaking, the feedback controller 208 compares the actual load being produced (e.g., in megawatts, pressure, and/or a percentage capacity) by the boiler/turbine process 250 to the load demand index generated by or indicated by the load demand signal 201 to produce an error signal. This error signal may be generated by a process model (not shown) which may be generated by the feedforward controller 210 and/or the boiler/turbine process 250. The feedback controller 208 uses this error signal to produce a first turbine control signal which is provided to a boiler signal combiner 212 and a turbine signal combiner 214. One such example of signal combiners are those that perform summing functions. Other examples are possible.

The feedforward controller 210 also operates on the load demand 201 and produces a feedforward control signal which also is provided to the boiler and turbine signal combiners 212, 214. The combiners 212, 214 combine these signals, e.g., by summing these signals, to produce a boiler master control signal and a turbine master control signal to be used as inputs in operating the boiler/turbine process 250. In some approaches, the combiners 212, 214 may scale the summed signals if necessary to produce an appropriate master control signal for the boiler system or may combine these signals in other manners (e.g., averaging, multiplication, etc.).

The boiler master signal generated by the boiler master signal combiner 212 and the turbine master signal generated by the turbine master signal combiner 214 may be combined using a master signal combiner (not shown). Alternatively, the boiler and turbine master signals may be sent directly to components of the boiler/turbine process 250 to control its operation.

It is understood that any or both of the signal combiners 212, 214 may perform averaging, weighted averaging, and/or scaling of the received control signals to produce the master control signals.

Figure 3:
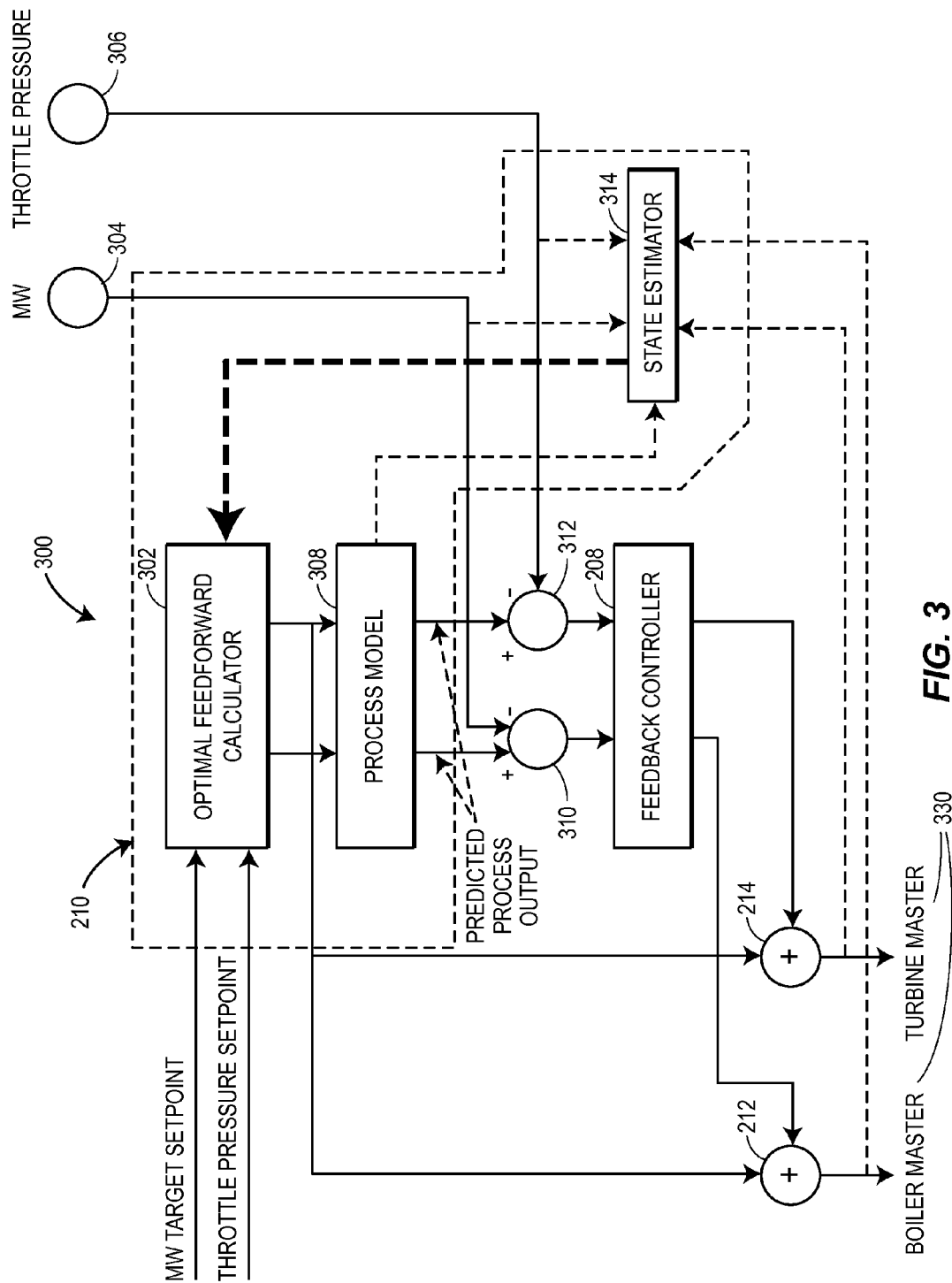
FIG. 3 illustrates a schematic block diagram of an optimal feedforward controller utilizing a state estimator to intermittently recalculate control based on the load ramp process in accordance with various embodiments of the invention.

Turning to FIG. 3, a plant system is provided which uses a state estimator to calculate a present operating condition of the plant. During normal operation of the plant, the plant may be operating in a steady-state (i.e., non-ramping) manner when a load demand set point is received. Upon receiving the load demand set point, components of the plant use operational characteristics relating to the steady state of the plant to determine control signals which cause the plant to be driven towards the set point. In the event that a new load demand set point is received while the plant is ramping towards the first load demand set point, the present operating condition of the plant is useful because it provides a more accurate baseline for use in calculating a modified control signals. In a general sense, the state estimator will receive power, pressure, and/or any other variables, measurements, and characteristics to obtain a state estimation of the plant. This state estimation is then used in calculating the modified control signal to drive the plant towards the second load demand set point.

As such, FIG. 3 provides a schematic block diagram of an optimal controller unit 300 utilizing a state estimator to intermittently recalculate a control signal for controlling a boiler master or a turbine master valve based on the load ramp process. In FIG. 3, the feedforward controller 210 of FIG. 2 is illustrated with individual components. It is understood that the feedforward controller 210 may include any number of fewer or additional components than illustrated. The controller unit 300 may begin by receiving power (MW) and pressure set points at an optimal feedforward calculator 302, which may be any type of feedforward calculator known to those having skill in the art. The feedforward computation may be treated in a multivariable manner if desired.

The feedforward calculator 302 then generates turbine and boiler control signals to be sent to the process model 308 and the boiler and turbine master signal combiners 212, 214 which may be those illustrated in FIG. 2. The process model unit 308 creates or implements a process model of the boiler and/or turbine process to generate predicted process outputs in the form of, for example, power (MW) and throttle pressure.

During the boiler and/or turbine process, sensed, measured and/or calculated power measurements 304 and throttle pressure measurements 306 are sent to summers 310 and 312, respectively. The power and pressure measurements 304 and 306 provided to the summers 310 and 312 may be sensed and/or calculated using any number of sensors and/or other devices. The summers 310 and 312 compare the measurements 304 and 306 with the predicted process outputs to produce difference or error signals at the outputs of the summers 310 and 312. The calculated difference between measured and predicted values are subsequently sent to the feedback controller 208 (which may be the feedback controller 208 of FIG. 2), which produces control signals to be sent to the boiler and turbine master signal combiners 212, 214. The boiler and master turbine signal combiners 212, 214 then combine the signals at their respective inputs to create and send to the boiler and turbine master controls 330.

The preceding description described the operation of the control unit when a target set point is received during a steady state, that is, when the boiler and/or turbine process is not in a load-ramp condition. During this operation, the state estimator 314 is continuously run in addition to any number of real-time feedback controllers 208 of FIG. 2. As such, the state estimator 314 also receives power measurements 304 and throttle pressure measurements 306 during operation of the boiler and/or turbine process. In the event that a new load demand is received while the boiler and/or turbine process is currently in a load ramping operation, upon receiving new power target and throttle pressure set points, the state estimator 314 uses current power and throttle pressure measurements 304, 306 and the predicted process outputs from the process model unit 308 to calculate the equipment's current state to be sent to the optimal feedforward calculator 302. The optimal feedforward calculator 302 then uses this state information to generate new turbine and boiler control signals to be sent to the process model 308 and to the boiler and turbine master signal combiners 212, 214. It is understood that in some examples, the state estimator 314 may not be run continuously, rather, the state estimator 314 may be run periodically or at various times throughout the process as desired.

In some examples, the initial model is state-variable based, and may be generically denoted as y=f(x,u), whereby "y" represents the controlled variables (or "CV") which may include, for example, power in megawatts and pressure, "u" represents the manipulated variables (or "MV") which include the boiler master fuel input and turbine master throttle valve, and "x" may denote intermediate state variables. In linear multi-input and multi-output cases, the model may be defined by the following state space equation:

$$x(k+1)=Ax(k)+Bu(k)$$

$$y(k)=Cx(k), \text{ where}$$

$$x(k) \in \Re^n, u(k) \in \Re^m, y(k) \in \Re^p$$

where A, B, and C have appropriate dimensions. In particular, A represents the system matrix having dimensions of n×n, B represents the control matrix having dimensions of n×m, and C represents the output matrix having dimensions of p×n, where n denotes the number of state variables, m denotes the number of control input variables, and p denotes the number of process output variables.

As previously stated, if the feedback controller 208 is state-variable based, a standard state estimation approach may be applied, such as, for example:

$$\hat{x}(k|k)=(A-K_eCA)\cdot\hat{x}(k-1|k-1)+(B-K_eCB)\cdot u(k-1)+K_e y(k)$$

where $\hat{x}(k|k)$ represents the estimated state and $K_e$ represents the pre-calculated state estimator gain.

Upon receiving the load demand change, the optimal feedforward profile calculator 302 may perform the calculation according to an exemplary optimization formulation:

$$\text{Minimize } J=\Sigma_{i=0}^{N}\{\|y^p(k_0+i|k_0)-y_{set}(k_0+i|k_0)\|_Q+\|u^p(k_0+i|k_0)\|_R+\|\epsilon\|_W\}$$

where the minimization calculation is subject to the following constraints:

$$\text{Initialization: } x_0=\hat{x}_{k_0}=\hat{x}(k|k)$$

$$\text{State constraint } y^p(k_0+i|k_0)=(y^p(k_0+i-1|k_0),x^p(k_0+i|k_0),u^p(k_0+i|k_0))$$

$$\text{Input constraint: } U_{min} \leq u^p(k_0+i|k_0) \leq U_{max}$$

$$\text{Input change constraint: } \|\Delta u^p(k_0+i|k_0)\| \leq \Delta U_{max}$$

$$\text{Output constraint: } \|y^p(k_0+i|k_0)-y_{required}(k_0+i|k_0)\| \leq \epsilon$$

In these equations, $k_0$ denotes the initial time, or the time when a load target change is detected, and $x_0$ denotes the initial state condition at the initial time which is set equal to the estimated state at the particular time. Likewise, $x^p(k_0+i|k_0)$ represents the predicted state, $y^p(k_0+i|k_0)$ represents the predicted output (CV), and $u^p(k_0+i|k_0)$ represents the input (MV) in the optimal feedforward profile calculation. Furthermore, $U_{min}$ and $U_{max}$ represent minimum and maximum values for control inputs. In many examples, the fuel input is usually scaled between 0 and 100, and the throttle valve opening is similarly scaled between values of 0 and 100. $\Delta U_{max}$ represents the maximum allowed movement for the control input during each sampling interval. $y_{required}(k_0+i|k_0)$ (i=1, ..., N) represent intermediate load levels along the trajectory which is requested by the load dispatch center for the current power operational state. Ideally, this value is where i=N is equal to the target load level. Additionally, the weighted 2-norm on a positive definite matrix P is defined as $\|x\|_p = \sqrt{x^T P x}$.

Additionally, in the optimization function, the symbols Q and R represent matrices for weighting factors on the process output and control input, respectively. The symbol W represents the weighting factor which penalizes an output constraint violation. The symbol ε represents a variable which is automatically determined by the optimization solution which limits violations to the output constraint.

As previously noted, no specific state estimation method is required in the embodiments described herein. If the boiler and turbine process is described using a linear system originally, a standard linear state estimator may be utilized as previously described. If the system is described using a nonlinear dynamic system, a nonlinear state estimator may be used, such as, for example a Kalman filter. It is also noted that, unlike conventional model predictive control processes, the state estimation is not utilized at each sampling interval. Rather, the state estimator is only used once to determine initial conditions at the beginning of the feedforward calculation. Further, in some examples, the optimization calculation is only performed once at the beginning of a load ramp process when a new target is detected. The entire calculated control profile will be applied at this time.

Further, it is understood that the prediction horizon (denoted by the character "N") is not fixed. Rather, the prediction horizon is dependent on the distance between the current load level and the target load level, and may vary between load demand levels. Specifically, the prediction horizon may be calculated using the following equation:

N=|Target load level−Initial load level|/Required_Ramp_Rate/Control_Sampling_Time It is understood that the described output constraints may be treated as "soft" constraints. These constraints may be handled using a variety of different approaches, such as, for example, by incorporating output constraint violations as penalties in the objective function.

Figure 4:
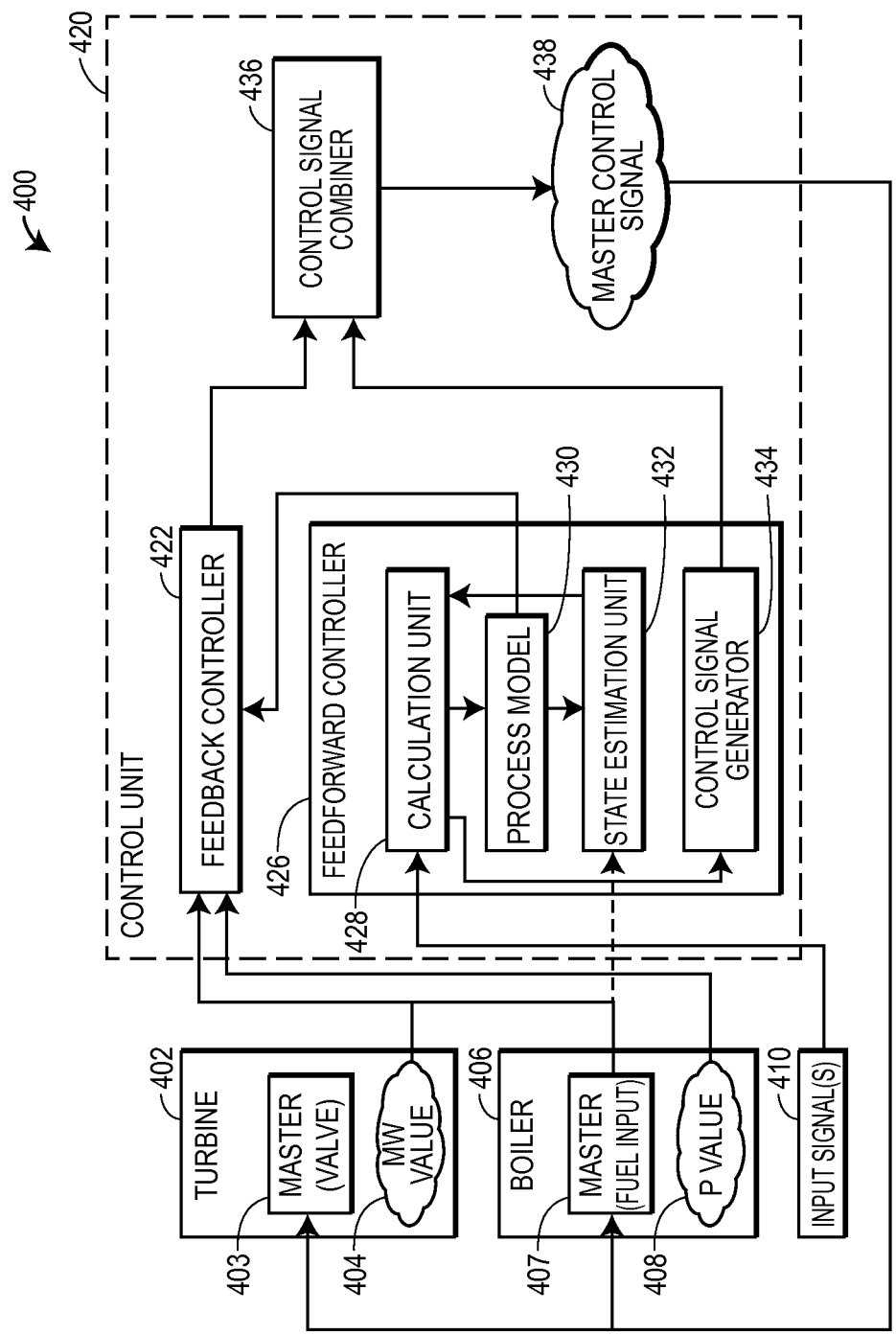
FIG. 4 illustrates a schematic block diagram of a typical boiler operated power plant in accordance with various embodiments of the invention.

FIG. 4 illustrates a high-level power plant 400 schematic having a turbine 402 including a turbine master (such as, for example, a governor valve) 403. The turbine 402 generates calculated, sensed, and/or measured values 404, which may include power or other values. The plant 400 further includes a boiler 406 including a boiler master (such as, for example, a fuel input) 407 and generates calculated, sensed, and/or measured values 408 which may include operating pressures or other values. The plant 400 further includes a control unit 420 which may be the controller 120 of FIG. 1. The control unit 420 includes a feedback controller 422 (which may be the feedback controller 208 of FIGS. 2 and 3), a feedforward controller 426 (which may be the feedforward controller 210 of FIGS. 2 and 3) which, in turn, may include any of the previously described components such as a calculation unit 428, a process model 430, a state estimation unit 432, and a control signal generator 434. The control unit 420 also includes a control signal combiner 436 which creates the master control signal 438. It is understood that the plant 400 may include any number of additional components and/or elements required for operation. More specifically, it is understood that the turbine 402 and the boiler 406 may include any number of components known to those having skill in the art, and accordingly, for the sake of brevity, will not be discussed in further detail.

The control unit 420 may include any combination of hardware and software elements selectively chosen to execute a particular task. The control unit 420 may be communicatively connected to the boiler 406 and/or the turbine 402 to control their operation. In some examples, the feedback controller 422 may use a proportional-integral-derivative (PID) controller or controllers which calculate an error value, or the difference between a desired setpoint and a measured variable, commonly referred to as "trimming action." Other examples of feedback controllers 422 are possible, such as a lead-lag controller, a model predictive controller, and/or a linear-quadratic-Gaussian controller. The feedforward controller 426 operates to foresee or forecast (predict) upcoming changes to the power plant 400 and allows for fast changes to operation of the control system 420.

The state estimation unit 432 is adapted to measure at least one characteristic associated with a current operational state of the power generating unit or power plant 100. It is understood that any known state estimation method and/or approach may be used by the state estimation unit 432 such as those previously described herein. For example, if the power plant 100 has a boiler and/or turbine process defined by a linear system, a standard linear state estimator may be applied. In other examples, when the boiler and/or turbine process is described or modelled by a nonlinear dynamic system, any type of typical or known nonlinear state estimator or calculation unit may be utilized. For example, an extended Kalman filter, or other estimator may be used for this purpose. The characteristic utilized by the state estimation unit 432 may include power and pressure values 404, 408 generated by the turbine 402 and boiler 406, respectively. The state variables calculated by the state estimator may include the rate of change of those measured output variables or higher order derivatives of measured output variables. Other examples are possible.

The calculation unit 428 may include any combination of hardware and software elements. For example, the calculation unit 428 may comprise a combination of processors, hardware, and/or memory devices. This calculation unit 428 may be located remotely from the other components of the control unit 420 or may alternatively be centrally located.

In operation, the feedforward controller 426 may perform a model-based constrained optimization in response to an input signal 410 representing a first load demand set point signal which specifies a first load demand set point is received by the calculation unit 428. During operation, the calculation unit 428 calculates a first optimal feedforward control signal and transmits the signal to the control signal generator 434 (which transmits the generated control signal to the control signal combiner 436). The control signal combiner 436 creates a master control signal 438 which in turn causes the plant 400 to operate in a load ramping manner to achieve the desired load. In other words, upon receiving the first load demand set point signal, the calculation unit 428 calculates a first set of operational parameters based on the first load demand set point. The feedforward control signal generator 434 then generates a feedforward control signal to include a first response characteristic.

Should the desired load change during a load ramping process, the calculation unit 428 may subsequently receive a second input signal 410 specifying a second load demand set point. Upon receiving the second input signal 410, the feedforward controller 426 determines whether an ongoing load ramp target change is occurring. If an ongoing load ramp target change is occurring, the state estimation unit 432 receives the values 404, 408 from the turbine 402 and boiler 406 as well as the model created by or stored by the process model unit 430 to generate an estimation of the present operating state of the plant 400. This estimation is then transmitted to the calculation unit 428, which calculates a second optimal feedforward control signal using a second set of operational parameters received by the state estimation unit 432. The feedforward control signal generator 434 then generates a second feedforward control signal to include a second response characteristic. This signal is sent to the control signal combiner 436 to create a master control signal 438 used to control the plant 400 to achieve the second desired load output.

During this time, the feedback controller 422 also receives the values 404, 408 and generates a feedback control signal to send to the control signal combiner 436. The feedforward control signal is combined with the feedback control signal via the control signal combiner 436 to create a master control signal 438 which controls the power plant 400. In other words, the master control signal 438 will include information from both the feedback controller 422 and the feedforward controller 426 to accurately map the subsequent operation of the plant.

It is understood that, in some approaches, the state estimation unit 432 is not utilized at every sampling interval. Rather, the state estimation unit 432 may be used initially at the onset of the feedforward control signal calculation as well as when subsequent load demand set points are received during load ramp changes. So configured, the state estimation unit 432 may provide complete state information at the beginning of each feedforward signal calculation. Because this state information serves as the initial state for the feedforward trajectory, the accuracy of subsequent optimization calculation for the feedforward control signal is improved. Further, it is understood that any number of load demand set point signals 410 may be sent and accordingly received by the calculation unit 428, and as such, the operation of the power plant 400 may continuously be adjusted to suit the present load demand.

Figure 5:
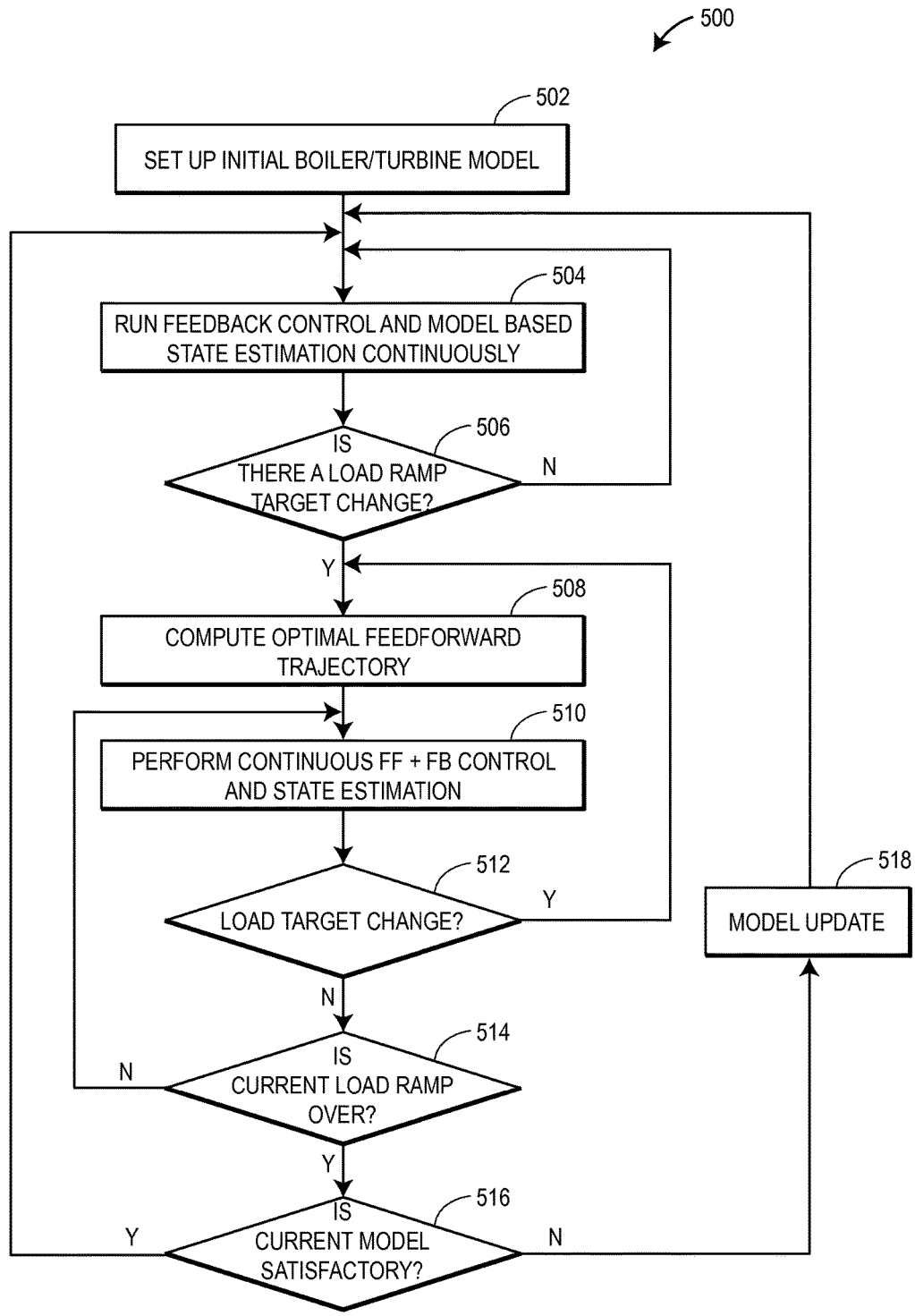
FIG. 5 illustrates a flow chart for controlling equipment in a plant in accordance with various embodiments of the invention.

Turning to FIG. 5, a control process 500 for controlling plant equipment that may be used in the systems of FIGS. 1-4 is provided. First, at a step 502, the initial boiler/turbine model is prepared or stored. At a step 504, the feedback control and model based state estimation are continuously run during operation of the plant or power generation system. At a step 506, the process 500 determines whether a load ramp target change has occurred. If a load ramp target change has not occurred, the process 500 returns to the step 504 and continues to continuously run the feedback control and model based state estimation.

If a load ramp target change has occurred, the process 500 proceeds to a step 508, where an optimal feedforward trajectory is calculated using the previously described state estimation determined by the state estimation unit. In this manner, a new state estimation is obtained and used to calculate a new feedforward trajectory. At a step 510, upon performing the optimal feedforward profile calculation while taking the current estimated state into account, feedforward and feedback control signals are combined and are used to control the power generation system in accordance with the concurrent and continuous state estimations. As previously described, the feedforward control signal is calculated and remains fixed until a subsequent load target change is detected. Any number of feedback controls may be implemented, such as, for example PID, lead-lag, MPC, and LQG.

At a step 512, the process 500 determines whether an updated load target is received. If a new load target is received, the process 500 returns to the step 508, where the optimal feedforward trajectory is computed. Otherwise, the process 500 determines whether the current load ramp is completed at a step 514, and if it is not completed, the updated control process returns to the step 510 and is executed until the load ramp is over and the load target is met.

Upon the load ramp completing, a step 516 determines whether the current process model is satisfactory. As an example, the root-mean-squared error between the actual power and pressure outputs are compared to the predicted outputs. If the root-mean squared error is greater than a threshold value, the process 500 proceeds to the step 518 where the process model is updated based on the collected data. If, at the block 516, the process model is determined to be satisfactory, the process 500 returns to the step 504. It is understood that any number of specific model identification approaches may be used, and thus these approaches will not be described in substantial detail.

Figure 6:
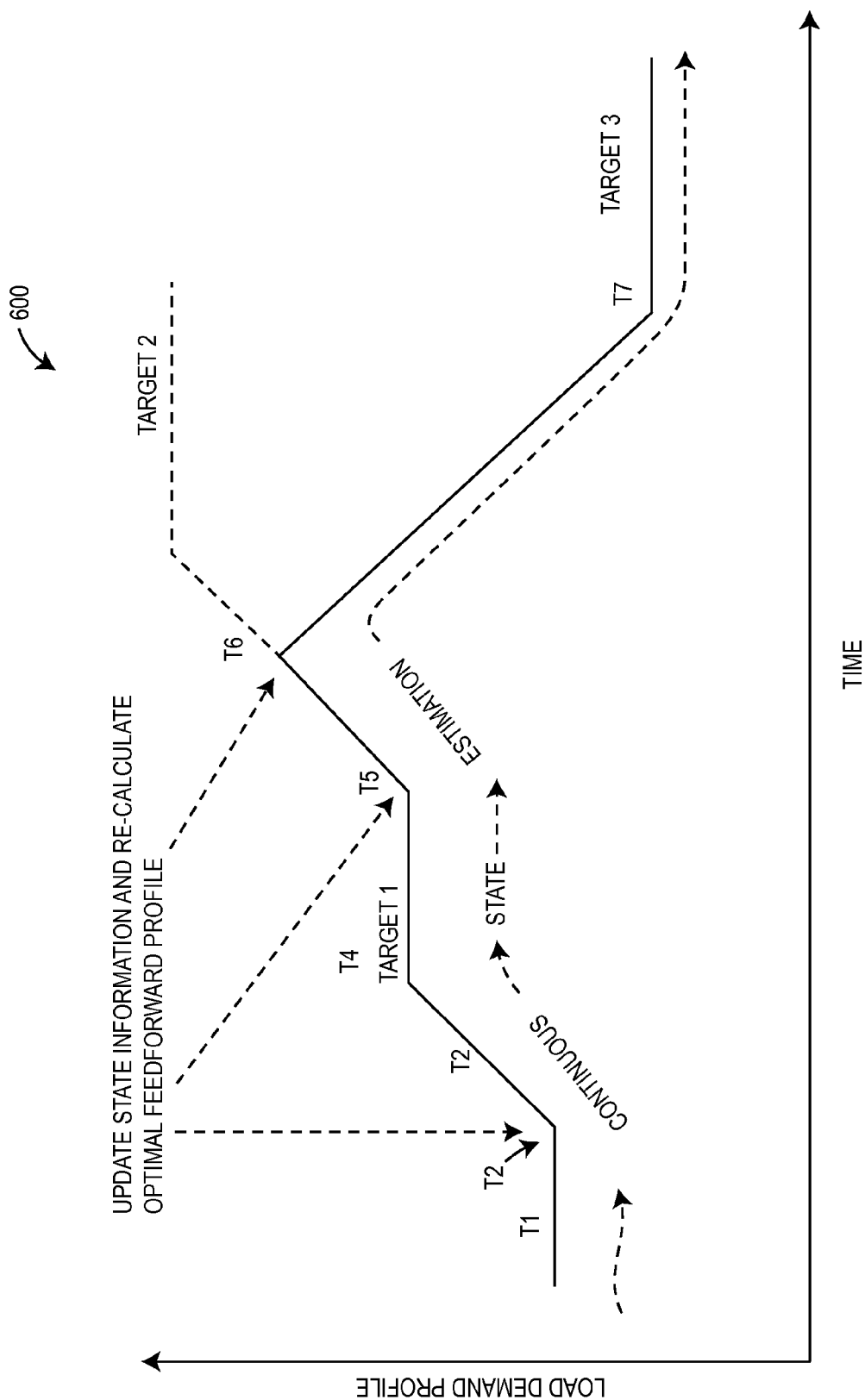
FIG. 6 illustrates a hypothetical signal diagram associated with the use of the control approaches described with regards to FIGS. 1-5 in accordance with various embodiments of the invention.

Turning to FIG. 6, an exemplary load demand/target profile 600 is provided. In this example, three different target values are requested. The optimal feedforward calculation is performed at the beginning of each load ramp upon detecting a new target. Accordingly, upon receiving the first target value (i.e., Target 1), at time T2, since the boiler/turbine process was previously operating in a steady state manner (i.e., during time T1), the present state information of the boiler/turbine process is used to calculate the optimal feedforward profile. During this time, the state estimator is not needed for optimal feedforward recalculation, however the state estimation calculation continues concurrently. In the profile 600, the plant ramps up to the new load Target 1 during time T3 and reaches Target 1 at a time T4. Thus, in this profile, Target 1 is met before receiving a new load target.

At a time T5, the boiler/turbine process receives a new target (i.e., Target 2). Because the boiler/turbine process was again operating in a steady state manner, the state estimation is not needed (though it is continuously being estimated). The optimal feedforward calculation calculates the control signal to meet the new load target.

During the course of meeting the second load demand target, at time T6, a third load demand target (i.e., Target 3) is received. Because the boiler/turbine process is undergoing a load demand ramp to meet Target 2, data collected at T6 from the state estimation unit is used by the optimal feedforward calculation to adjust the control signal to meet the new load target. By using the estimated state information, the boiler/turbine process 600 does not need to rely on the previous steady state and/or previous load demand values. In addition, because the continuously run state estimator accurately estimates the present state of the boiler/turbine process at all times during operation of the plant, information relating to the present state may be used to create control signals that efficiently obtain the desired load values. As illustrated in FIG. 6, the state estimation at time T6 is used by the control system to ramp the plant load down to Target 3 which is reached at a time T7. Generally speaking, use of the continuously operating state estimation unit in this manner enables the control system to reach the Target 3 more quickly than previous approaches which did not use a continuously (which may be periodically) scheduled state estimation unit which, instead, simply treated the current plant condition as the steady-state to perform load ramp calculations.

While the forgoing description of a feedforward control circuit has been described in the context of controlling a power generating plant and, in particular, a boiler and turbine operated power generating plant, this control method can be used in other process control systems, such as in industrial process control systems used to control industrial or manufacturing processes. More particularly, this control method may be used in any process plant or control system that receives numerous set point changes and which controls slow reacting equipment, and additionally may be used to produce feedforward control signals or other types of control signals in these or other environments.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

What is claimed is:

1. A method of controlling a power generating unit, the method comprising:
   receiving, at a computing device, a signal indicative of a first load demand set point, the first load demand set point indicative of a first desired output of the power generating unit;
   determining, via the computing device, a control signal to be used to drive the power generating unit to operate to generate power according to an initial load ramp process, the initial load ramp process based on a particular model and the first load demand set point;
   periodically or continuously performing a state estimation while the power generating unit is ramping, according to the initial load ramp process, towards the first load demand set point to obtain a current state estimation of the power generating unit; and
   while the power generating unit is ramping, according to the initial load ramp process, towards the first load demand set point:
      receiving a signal indicative of a second load demand set point, the second load demand set point indicative of a second desired output of the power generating unit;
      using the current state estimation to calculate, via the computing device, a modified control signal for use in driving the power generating unit to operate to generate power according to a modified load ramp process, the modified load ramp process based on the particular model and the second load demand set point; and
      using the modified control signal to modify operation of the power generating unit to operate according to the modified load ramp process to drive the power generating unit towards the second desired output specified by the second load demand set point signal.

2. The method of claim 1, wherein performing the state estimation comprises a performing a linear state estimation process.

3. The method of claim 1, wherein performing the state estimation comprises performing a nonlinear state estimation process.

4. The method of claim 1, wherein using the modified control signal to modify the operation of the power generating unit to operate according to the modified load ramp process comprises calculating an optimal feedforward trajectory according to an optimization formulation.

5. The method of claim 4, wherein using the modified control signal to modify the operation of the power generating unit to operate according to the modified load ramp process comprises using the modified control signal to generate a predicted process output.

6. The method of claim 5, wherein using the modified control signal to modify the operation of the power generating unit to operate according to the modified load ramp process further comprises combining the predicted process output with a measured process value to generate a combined process output and sending the combined process output to a feedback controller to produce a control signal to operate the power generating unit.

7. The method of claim 1, further comprising using the modified control signal to compute an error value between the second load demand set point and an actual operational power output of the power generating unit and creating a new modified model which minimizes the error value.

8. A control system for controlling a power generating unit comprising:
   a calculation unit adapted to:
      receive a signal indicative of a first load demand set point, the first load demand set point indicative of a first desired output of the power generating unit; and
      receive, while the power generating unit is ramping according to an initial load ramp process towards the first load demand set point, a signal indicative of a second load demand set point, the second load demand set point indicative of a second desired output of the power generating unit;
   a state estimation unit coupled to the calculation unit, the state estimation unit adapted to measure at least one characteristic associated with a current operational state of the power generating unit while the power generating unit is ramping, according to the initial load ramp process, towards the first load demand set point, the state estimation further adapted to generate a current state calculation based on the at least one characteristic;
   wherein the calculation unit is further adapted to calculate a first set of operational parameters based on the first load demand set point, and the calculation unit is further adapted to calculate a second set of operational parameters based on the second load demand set point and the current state calculation; and
   a control signal generator adapted to:
      generate an initial control signal to drive the power generating unit towards the first desired output according to the initial load ramp process, the initial load ramp process based on a particular model and the first set of operational parameters; and
      generate, while the power generating unit is ramping towards the first load demand set point according to the initial load ramp process, a modified control signal to drive the power generating unit towards the second desired output according to a modified load ramp process, the modified load ramp process based on the particular model and the second set of operational parameters.

9. The control system of claim 8, wherein the calculation unit is further adapted to calculate an optimal feedforward trajectory according to an optimization formulation.

10. The control system of claim 9, wherein the control signal generator is further adapted to generate a predicted process output using the modified control signal.

11. The control system of claim 10, wherein the control signal generator is further adapted to combine the predicted process output with a measured process value to generate a combined process output and send the combined process output to a feedback controller to produce a further control signal to operate the power generating unit.

12. The control system of claim 8, wherein the at least one characteristic associated with the current operational state includes at least one of an operational pressure of the power generating unit or an operational power generation of the power generating unit.

13. The control system of claim 8, wherein the calculation unit is further adapted to calculate an error value representing a difference between actual operational parameters at a given time and the second set of operational parameters at the given time, wherein upon the difference exceeding a threshold value, the state estimation unit is adapted to measure at least one subsequent characteristic, the calculation unit is adapted to calculate a subsequent set of operational parameters based on the at least one subsequent characteristic, and the control signal generator is further adapted to control the power generating unit based on the particular model and the subsequent set of operational parameters.

14. The control system of claim 8, wherein the calculation unit is adapted to calculate the second set of operational parameters only upon receiving a load demand set point signal.

15. A method of controlling equipment in a plant, the method comprising:
configuring an initial optimal operational control of the equipment based on a particular model and a signal indicative of an initial load demand set point, the initial load demand set point indicative of an initial desired output of the equipment;
controlling the equipment in the plant to operate according to an initial load ramp process, the initial load ramp process based on the initial optimal operational control;
periodically or continuously running, while the equipment is ramping according to the initial load ramp process towards the initial load demand set point, a model-based state estimation to obtain a current state estimation, the model-based state estimation being based on a plurality of operational values of the equipment; and
while the equipment is ramping according to the initial load ramp process towards the initial load demand set point:
  determining whether a signal indicative of a new load demand set point is received, the new load demand set point indicative of a new desired output of the equipment;
  upon receiving the signal indicative of the new load demand set point, computing a new optimal operational feedforward control trajectory using the current state estimation; and
  modifying the controlling of the equipment in the plant so that the equipment operates in accordance with a modified load ramp process to drive the equipment towards the new load demand set point, the modified load ramp process based on the particular model and the new optimal operational feedforward control trajectory.

16. The method of claim 15, further comprising running a feedback control calculation in addition to the model-based state estimation, the feedback control calculation comprising one of a proportional-integral-derivative controller, a lead-lag controller, a model predictive controller, and a linear-quadratic-Gaussian controller.

17. The method of claim 16, wherein the modified load ramp process is further based on the feedback control calculation.

18. The method of claim 15, further comprising:
determining whether or not the equipment has reached the new load demand set point; and
upon determining the equipment has not reached the new load demand set point, computing a subsequent optimal operational feedforward and feedback control trajectory using a model-based state estimation representative of a current time.

19. The method of claim 15, wherein computing the new optimal operational feedforward control trajectory comprises performing a minimization calculation involving at least one of an initialization parameter, a state constraint, an input constraint, an input change constraint, or an output constraint.

20. A power plant, comprising:
a turbine;
a boiler coupled to the turbine that operates to create steam to drive the turbine; and
a control unit communicatively connected to the boiler to control the operation of the boiler, the control unit including;
  a feedback controller that produces a feedback control signal;
  a feedforward controller that produces a feedforward control signal, the feedforward controller including:
    a calculation unit adapted to:
      receive a signal indicative of a first load demand set point, the first load demand set point indicative of a first desired output of the power plant; and
      receive, while the plant is ramping according to an initial load ramp process towards the first load demand set point, a signal indicative of a second load demand set point, the initial load ramp process based on a particular model and the first load demand set point, and the second load demand set point indicative of a second desired output of the power plant;
    a state estimation unit adapted to, while the power plant is ramping according to the initial load ramp process towards the first load demand set point, measure at least one characteristic associated with a current operational state of the power plant and generate a current state calculation based on the at least one characteristic;
    wherein the calculation unit is further adapted to calculate a first set of operational parameters based on the first load demand set point, and the calculation unit is further adapted to calculate, while the plant is ramping according to the initial load ramp process towards the first load demand set point, a second set of operational parameters based on the second load demand set point and the current state calculation; and
  a feedforward control signal generator adapted to:
    produce, upon receiving the signal indicative of the first demand set point, the feedforward control signal, the feedforward control signal including a first response characteristic, the first response characteristic based on the first set of operational parameters, and the feedforward control signal used to drive the power plant towards the first desired output according to the initial load ramp process; and produce, upon receiving the signal indicative of the second demand set point while the power plant is ramping according to the initial load ramp process towards the first load demand set point, a modified feedforward control signal, the modified feedforward control signal including a second and different response characteristic, the second and different response characteristic based on the second set of operational parameters, and the modified feedforward control signal used to modify the driving of the power plant towards the second desired output according to a modified load ramp process, the modified load ramp process based on the particular model and the second load demand set point; and a control signal combiner that combines the modified feedforward control signal and the feedback control signal to create a master control signal for controlling the power plant.

21. The boiler operated power plant of claim 20, wherein the feedback controller comprises one of a proportional-integral-derivative controller, a lead-lag controller, a model predictive controller, and a linear-quadratic-Gaussian controller.

22. The boiler operated power plant of claim 21, wherein the feedforward controller is adapted to produce control signals only upon receiving a load demand set point signal.

23. The boiler operated power plant of claim 20, wherein when the state estimation unit is described by a nonlinear dynamic process, the calculation unit is a nonlinear calculation unit.

24. The boiler operated power plant of claim 20, wherein when the state estimation unit is described by a linear dynamic process, the calculation unit is a linear calculation unit.

* * * * *